No. 651,823. Patented June 19, 1900.
J. P. BYNE.
VEHICLE HUB AND SPINDLE.
(Application filed Feb. 25, 1899.)
(No Model.)

Witnesses
J. C. Shaw
E. E. Brock

Inventor
John P. Byne,
by O'Meara & Co.
Attorneys

UNITED STATES PATENT OFFICE.

JOHN PERRY BYNE, OF BLYTHE, GEORGIA.

VEHICLE HUB AND SPINDLE.

SPECIFICATION forming part of Letters Patent No. 651,823, dated June 19, 1900.

Application filed February 25, 1899. Serial No. 706,841. (No model.)

*To all whom it may concern:*

Be it known that I, JOHN PERRY BYNE, a citizen of the United States, residing at Blythe, in the county of Richmond and State of Georgia, have invented a new and useful Vehicle Hub and Spindle, of which the following is a specification.

The invention relates generally to vehicle hubs and axles, and more particularly to a ball-bearing hub, one object of the invention being to provide cheapness and simplicity of construction; and another object is to provide means for removing the hub without disturbing the ball-bearings.

With these objects in view the invention consists in making the axle-spindle of uniform diameter and constructing the hub-boxing with intense annular grooves adapted to contain antifriction-balls; and the invention consists also in providing a sleeve of the same diameter as the spindle to slide the wheel upon when necessary, thereby preventing displacement of the antifriction-balls.

The invention consists also in certain details of construction and novelties of combination, all of which will be fully described, and pointed out in the claim.

Figure 1:
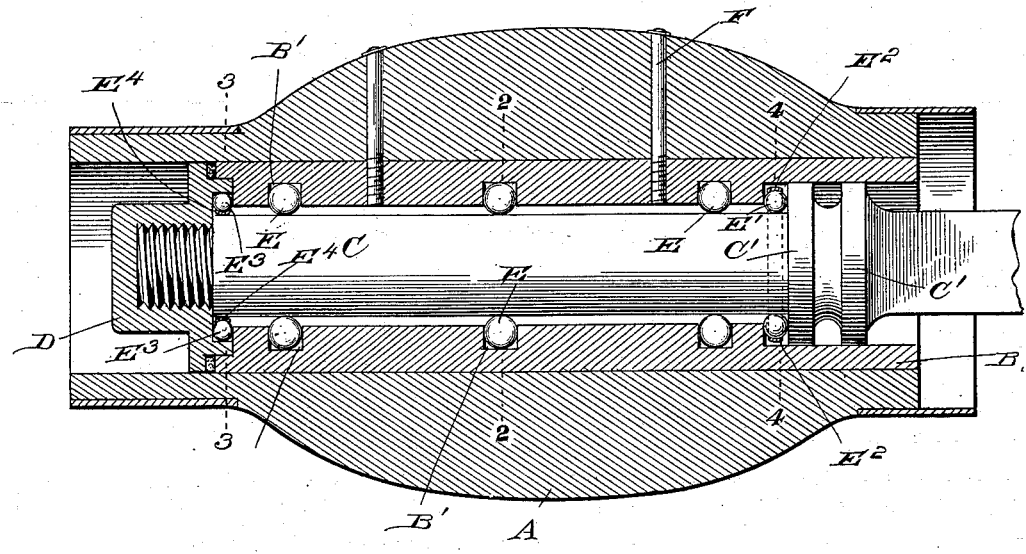
Figures 2, 3, 4, 5:
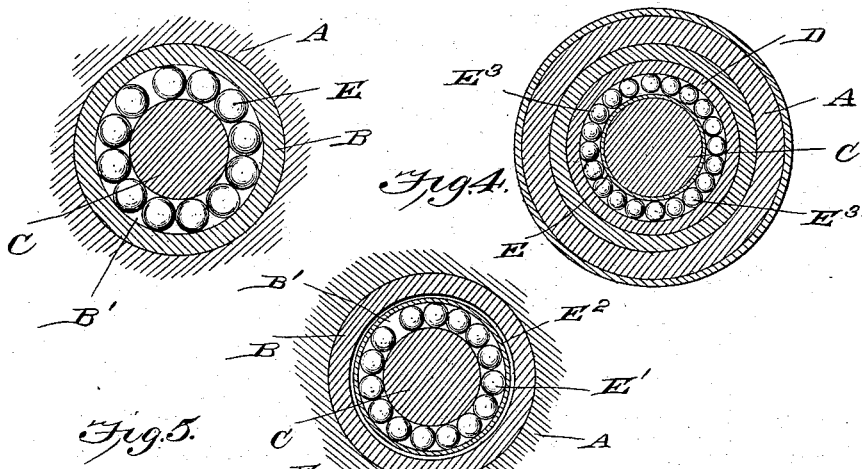

In the drawings forming part of this specification, Figure 1 is a detail sectional view of the hub, the spindle and ball-bearings being shown in elevation. Fig. 2 is a section on the line 2 2 of Fig. 1. Fig. 3 is a section on the line 3 3 of Fig. 1, and Fig. 4 is a section on the line 4 4 of Fig. 1. Fig. 5 is a detail sectional view showing the manner of removing the wheel.

In carrying out my invention I employ a hub A, having a boxing or skein B fitted therein.

The spindle C is of uniform diameter, but is provided with shoulders C' at the rear end, which fit in the enlarged rear end of the boxing or skein, and the forward end is slightly reduced and threaded to receive the nut D.

The boxing or skein B has a series of interior annular grooves B', in which are arranged the antifriction-balls E, upon which the spindle bears, thereby greatly reducing the friction between the spindle and skein. A series of balls E' are arranged between the spindle collar or shoulder and the skein, said balls being held in place by a circular band $E^2$, and a series of balls $E^3$ are held by a band $E^4$ and located within the flange of the axle-nut.

Oil-passages are bored through the hub and skein, said passages being lined by screw-threaded tubes F.

It will thus be seen that I provide a cheap and simple construction of vehicle-hub and bearing, and in order to remove the wheel without disturbing the ball-bearings I employ a tube G, which is of the same external diameter as the spindle, said tube being placed over the reduced and threaded end of the spindle, and the hub can then be moved out upon the tube without displacing any of the ball-bearings.

Having thus fully described my invention, what I claim as new, and desire to secure by Letters Patent of the United States, is—

The combination, with an axle of uniform diameter throughout its length and provided at one end with a shoulder and at the opposite end with a removable nut of a hub thereon, the boxing of which is recessed at each end to fit over said shoulder and nut and the intermediate portion provided with internal annular grooves, the distance between the recessed portions at the ends being less than the distance between the shoulder and nut of the axle, a series of balls within each of said recessed portions in contact with the ends of the recessed portions of the boxing and the nut and shoulder of the axle, respectively, a band for engaging with each of said series of balls, and a series of balls, in each annular groove in the boxing.

JOHN PERRY BYNE.

Witnesses:
O. J. GAY,
ROBT. L. RHODES.